(12) United States Patent  
Erickson

(10) Patent No.: US 9,370,819 B2  
(45) Date of Patent: Jun. 21, 2016

(54) COLLAR INSTALLATION END EFFECTOR

(75) Inventor: Chris J. Erickson, Garden Grove, CA (US)

(73) Assignee: The Boeing Company, Chicago, IL (US)

(*) Notice: Subject to any disclaimer, the term of this patent is extended or adjusted under 35 U.S.C. 154(b) by 60 days.

(21) Appl. No.: 13/437,532

(22) Filed: Apr. 2, 2012

(65) Prior Publication Data  
US 2013/0255053 A1 Oct. 3, 2013

(51) Int. Cl.  
*B23Q 17/00* (2006.01)  
*B21J 15/02* (2006.01)  
*B21J 15/28* (2006.01)  
*B25J 9/16* (2006.01)

(52) U.S. Cl.  
CPC .............. *B21J 15/022* (2013.01); *B21J 15/28* (2013.01); *B25J 9/1697* (2013.01); *G05B 2219/37555* (2013.01); *G05B 2219/40583* (2013.01); *G05B 2219/40607* (2013.01); *Y10T 29/4978* (2015.01); *Y10T 29/53022* (2015.01)

(58) Field of Classification Search  
CPC ........ B21J 15/002; B21J 15/28; B21J 9/1697; B23P 19/00  
USPC ............... 29/407.1, 407.04, 407.05, 407.08, 29/407.09, 525.01, 525.05; 901/9, 11, 16, 901/29, 30, 32, 41, 47  
See application file for complete search history.

(56) References Cited

U.S. PATENT DOCUMENTS

| 4,819,522 | A | | 4/1989 | Stinson |
| 5,214,490 | A | * | 5/1993 | Abe et al. ....................... 356/634 |
| 5,697,521 | A | * | 12/1997 | Dixon ............................ 221/297 |
| 5,915,915 | A | * | 6/1999 | Allen et al. ................. 414/744.1 |
| 6,058,598 | A | | 5/2000 | Dixon et al. |
| 2004/0012217 | A1 | | 1/2004 | Shafer et al. |
| 2008/0155807 | A1 | * | 7/2008 | Toh et al. .................... 29/525.01 |
| 2009/0260413 | A1 | | 10/2009 | Tomchick |
| 2010/0180424 | A1 | | 7/2010 | Le Vacon |
| 2010/0295935 | A1 | * | 11/2010 | Case et al. ....................... 348/95 |

OTHER PUBLICATIONS

Extended European Search Report of Application No. 13161105; Aug. 1, 2013; 6 pages.  
Chinese Office Action, Application No. 201310110369.3, dated Nov. 3, 2015, pp. 16.

* cited by examiner

*Primary Examiner* — David Bryant  
*Assistant Examiner* — Lee A Holly  
(74) *Attorney, Agent, or Firm* — Armstrong Teasdale LLP

(57) ABSTRACT

An assembly tool includes a head and an actuator system. The head includes a collar swaging tool that is moveable along a first axis substantially perpendicular to a longitudinal axis of the assembly tool. A sensor system detects a first position of the head within the confined space, and a second position of the collar swaging tool relative to the target object. The actuator system positions the head within the confined space, and the collar swaging tool relative to the target object.

14 Claims, 5 Drawing Sheets

COLLAR INSTALLATION END EFFECTOR

BACKGROUND

The present disclosure relates generally to assembly tools and, more particularly, to methods and systems for coupling a collar to a target object in a confined space.

At least some known automated assembly tools include large, heavy multi-function end effectors that are sized and/or designed to couple a collar to a fastener in an open space. More specifically, at least some known end effectors are sized and/or configured to operate on structures that are easily accessible including, for example, the fuselage or wing panels and spars. However, at least some known aircraft have confined spaces, such as wing boxes, that may be difficult for at least some known end effectors to access. As such, in such space-constrained/limited areas, at least some known collars must be manually installed using a hand collar installation tool. Manually installing collars may be time consuming and/or tedious.

BRIEF SUMMARY

In one aspect, a method is provided for coupling a collar to a target object in a confined space. The method includes detecting, using a sensor system, a first position of a head within the confined space. The head includes a collar swaging tool that is moveable along a first axis. Using an actuator system that is communicatively coupled to the sensor system, the head is positioned within the confined space. Using the sensor system, a second position of the collar swaging tool relative to the target object is detected. The collar swaging tool is moved along the first axis to position the collar swaging tool relative to the target object.

In another aspect, an assembly tool is provided for coupling a collar to a target object in a confined space. The assembly tool has a longitudinal axis. The assembly tool includes a head and an actuator system. The head includes a collar swaging tool that is moveable along a first axis substantially perpendicular to the longitudinal axis. A sensor system is configured to detect a first position of the head within the confined space, and a second position of the collar swaging tool relative to the target object. The actuator system is communicatively coupled to the sensor system to facilitate positioning the head within the confined space, and the collar swaging tool relative to the target object.

In yet another aspect, a computing device is provided for coupling a collar to a target object in a confined space. The computing device includes a processor, and a non-transitory computer-readable storage medium having encoded thereon computer-readable instructions executable by the processor to perform functions including receiving a first position of a head within the confined space. The head includes a collar swaging tool that is moveable along a first axis. The head is positioned within the confined space. A second position of the collar swaging tool relative to the target object is received. The collar swaging tool is moved along the first axis to position the collar swaging tool relative to the target object.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to assembly tools and, more particularly, to methods and systems for use in coupling a collar to a target object in a confined space. In one embodiment, an assembly tool includes a head and an actuator system that includes a plurality of degrees of freedom. The head includes a collar swaging tool that is moveable along a first axis that is substantially perpendicular to a longitudinal axis of the assembly tool. A macro-sensor system detects a first position of the head within the confined space, and a micro-sensor system detects a second position of the collar swaging tool relative to the target object. The actuator system positions the head within the confined space based on the first position, and positions the collar swaging tool relative to the target object based on the second position.

As used herein, an element or step recited in the singular and proceeded with the word "a" or "an" should be understood as not excluding plural elements or steps unless such exclusion is explicitly recited. Moreover, an element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
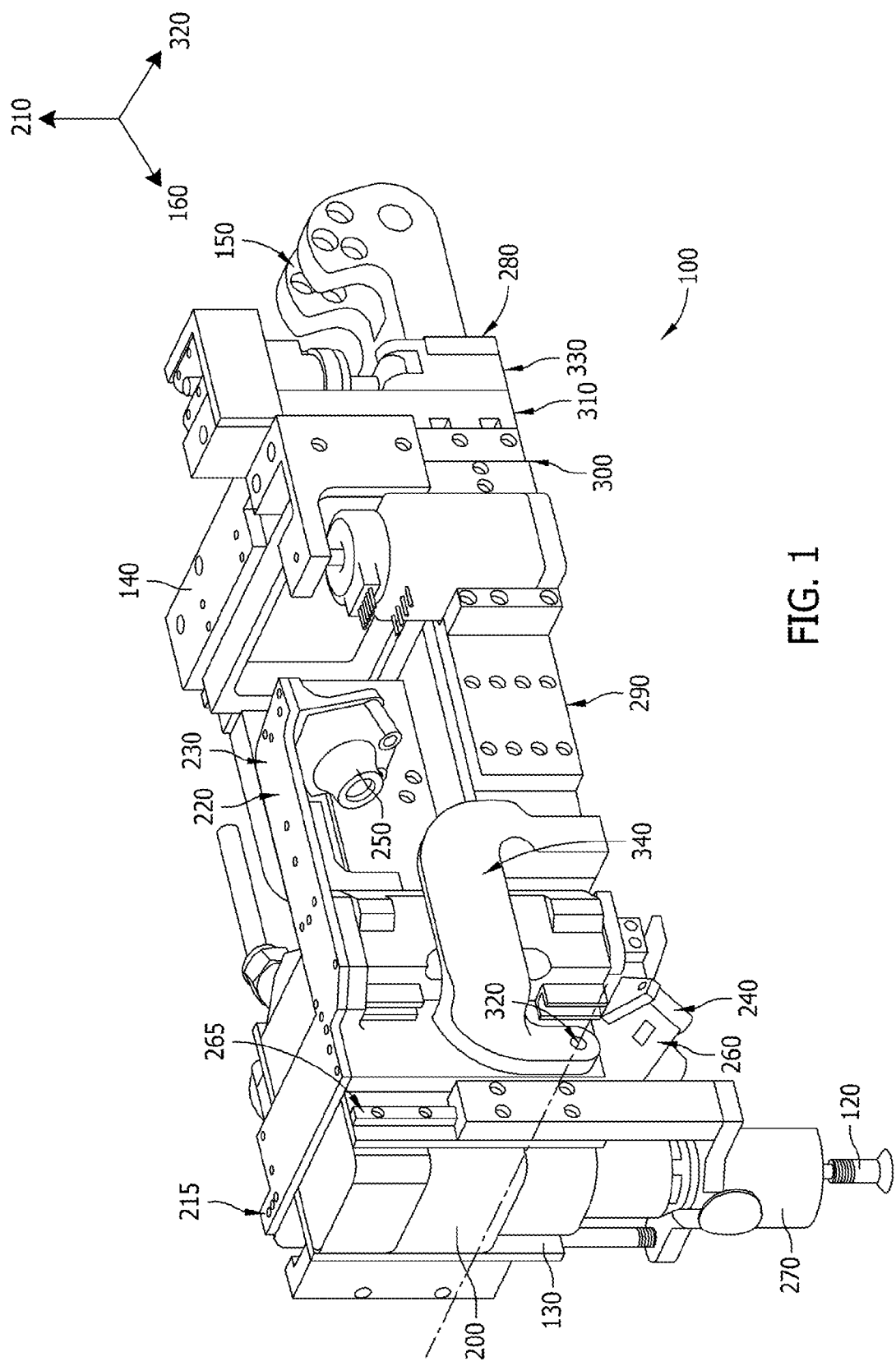
FIGS. 1-3 are perspective views of an exemplary end effector during various stages of an installation process.
Figure 2:
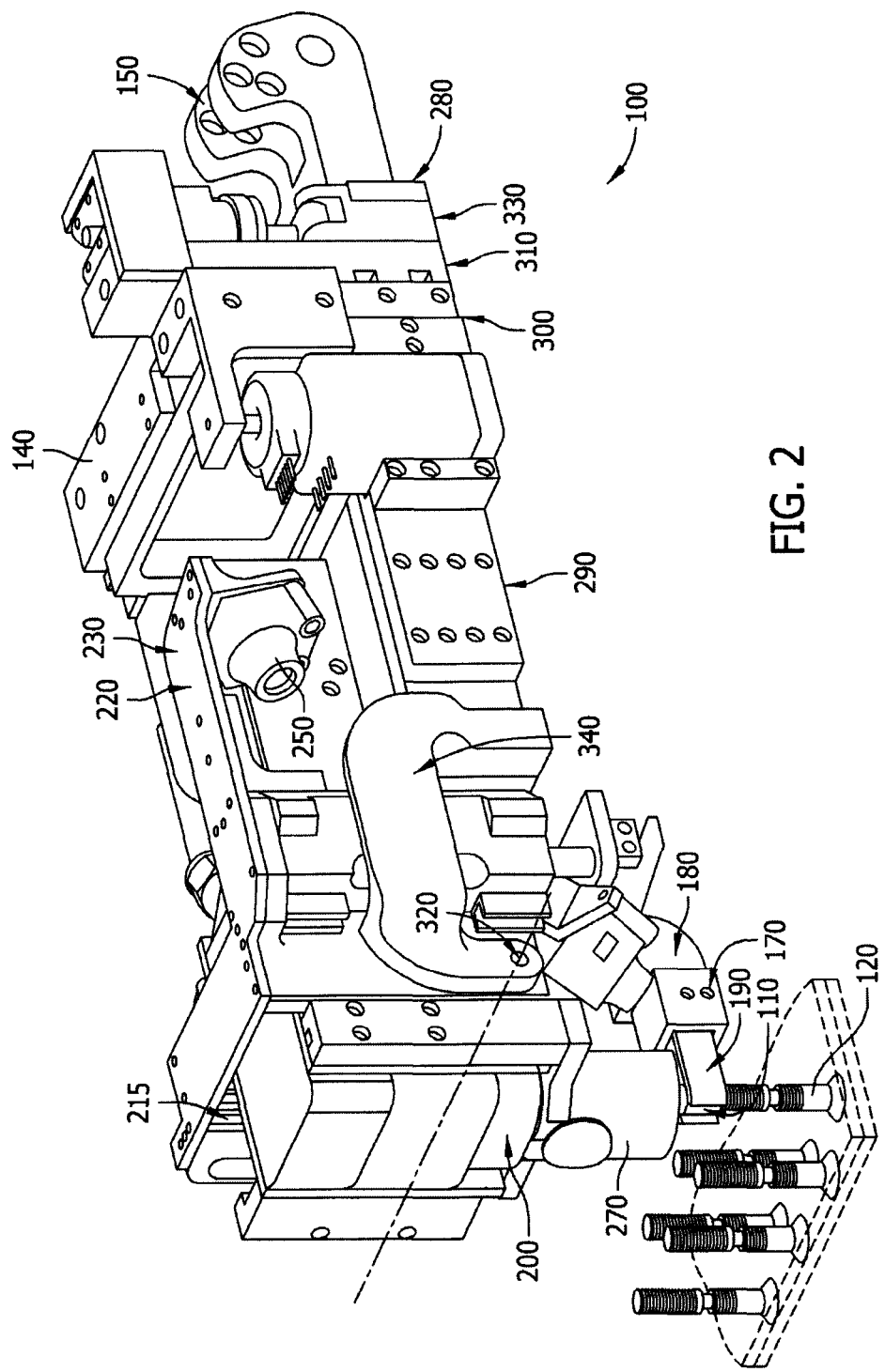
Figure 3:
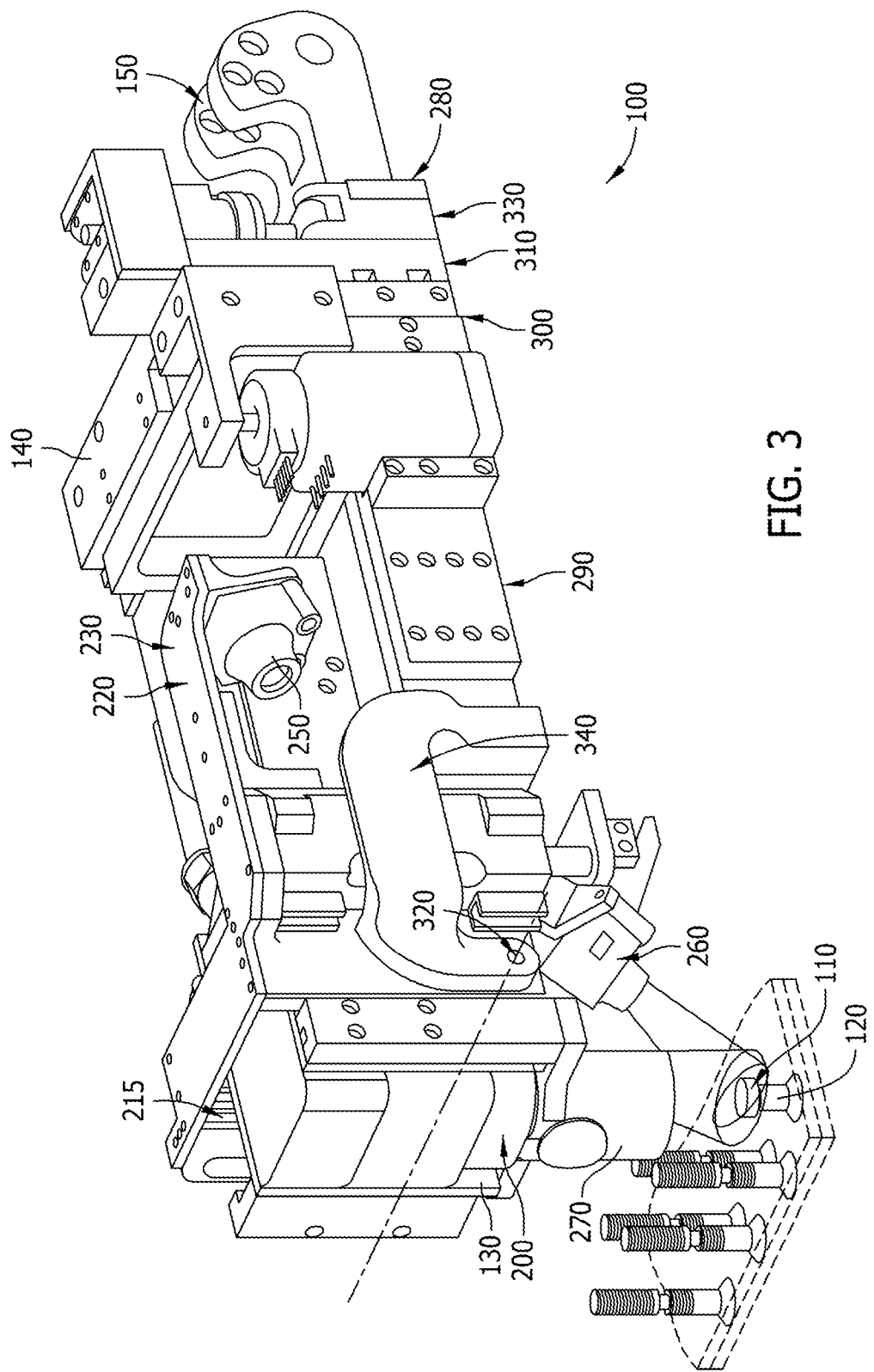

FIGS. 1-3 are perspective views of an exemplary assembly tool or end effector 100 that is configured to couple a collar 110 (shown in FIGS. 2 and 3) to a target object. In the exemplary embodiment, the target object is a fastener 120. Alternatively, the target object may be any object that enables end effector 100 to function as described herein.

In the exemplary embodiment, end effector 100 includes a head 130, a body 140 extending from head 130, and a wrist 150 extending from body 140. In the exemplary embodiment, wrist 150 may be coupled to a robot system. In the exemplary embodiment, body 140 extends substantially longitudinally between head 130 and wrist 150 along a longitudinal axis 160 (i.e., a Y-axis).

In the exemplary embodiment, head 130 includes a collar dispensing system 170 (shown in FIG. 2) that includes an arm 180 (shown in FIG. 2) and a plurality of fingers 190 (shown in FIG. 2) that each extend from arm 180. In the exemplary embodiment, arm 180 and/or fingers 190 are moveable between an arm and/or finger home position (as shown in FIGS. 1 and 3) and an arm and/or finger deployed position (as shown in FIG. 2). In the exemplary embodiment, arm 180 defines a channel (not shown) therein that is sized and/or oriented to retain a plurality of collars 110, and fingers 190 are oriented to retain a single collar 110 in a predetermined position (shown in FIG. 2) relative to arm 180 and/or fingers 190. More specifically, in the arm deployed position of the exemplary embodiment, arm 180 is positioned to feed and/or to provide fingers 190 with a collar 110 each time a collar 110 is removed from the predetermined position until no collars 110 remain within arm 180 and/or until a stop signal is received.

Alternatively, fingers 190 may retain any number of collars 110 that enable end effector 100 to function as described herein.

In the exemplary embodiment, collar dispensing system 170 includes a gas cylinder system (not shown) that positions collar 110 in the predetermined position and/or selectively moves collar 110 adjacent to fastener 120 from the predetermined position. More specifically, in the exemplary embodiment, a first gas cylinder (not shown) is oriented to discharge gas through arm 180 such that collars 110 are biased towards fingers 190 or, more particularly, towards the predetermined position. In the exemplary embodiment, a sensor (not shown) detects a presence of a single collar 110 in the predetermined position. Accordingly, the gas cylinder system selectively discharges gas from the first gas cylinder when a collar 110 is not in the predetermined position and/or not discharge gas from the first gas cylinder when a collar 110 is in the predetermined position.

In the exemplary embodiment, a second gas cylinder (not shown) is oriented to discharge a gas toward fingers 190 such that fingers 190 are selectively moved towards the finger deployed position. In the exemplary embodiment, a sensor (not shown) detects a position of fingers 190 in the finger deployed position. Accordingly, the gas cylinder system may selectively discharge gas from the second gas cylinder when fingers 190 are in the finger home position and/or not discharge a gas from the second gas cylinder when fingers 190 are in the finger deployed position. Alternatively, any device and/or mechanism may be used to selectively position collar 110 in the predetermined position.

In the exemplary embodiment, head 130 includes a collar swaging tool 200 that is selectively moveable along a first axis 210 (i.e., a Z-axis) that is oriented substantially perpendicular to longitudinal axis 160 between a swaging tool home position and a swaging tool deployed position. As used herein, the term "swaging" should be understood as a forging process used to deform collar 110 and/or fastener 120. Alternatively, head 130 may include any tool that enables end effector 100 to function as described herein. In the exemplary embodiment, an actuator 215 selectively moves collar swaging tool 200 along first axis 210 when collar 110 is generally positioned over fastener 120. That is, in the exemplary embodiment, collar swaging tool 200 is moved along first axis 210 towards the swaging tool deployed position when fingers 190 are in the finger deployed position to facilitate positioning collar 110 onto fastener 120. In the exemplary embodiment, collar swaging tool 200 swages collar 110, removes a tail of fastener 120 from a body of fastener 120, and/or stores the fastener tail in a tail storage compartment (not shown).

In the exemplary embodiment, end effector 100 includes a sensor system 220 that detects a first position of head 130 and/or body 140 within a confined space (i.e., relative to at least one surface defining the confined space), and a second position of collar swaging tool 200 relative to fastener 120. More specifically, in the exemplary embodiment, sensor system 220 includes a first subsystem 230 that detects the first position and a second subsystem 240 that detects the second position. In the exemplary embodiment, first subsystem 230 includes a first camera 250 that is oriented and/or positioned to detect a relative macro-position of end effector 100 in the confined space. In the exemplary embodiment, second subsystem 240 includes a plurality of second cameras 260 that are oriented and/or positioned to detect a micro-position of end effector 100 relative to fastener 120. In the exemplary embodiment, an actuator 265 selectively moves a backlight 270 between a backlight home position (as shown in FIGS. 2 and 3) and a backlight deployed position (as shown in FIG. 1) along first axis 210. More specifically, in the exemplary embodiment, backlight 270 is selectively positionable in the backlight deployed position to produce a silhouette shadow behind fastener 120 such that the second position is detectable by second subsystem 240. Alternatively, any number of subsystems and/or cameras may be used that enables sensor system 220 to function as described herein.

In the exemplary embodiment, end effector 100 includes an actuator system 280 that is communicatively coupled to sensor system 220 to enable head 130 and/or body 140 to be selectively positioned within the confined space, and to enable collar swaging tool 200 to be selectively positioned relative to fastener 120. More specifically, in the exemplary embodiment, actuator system 280 includes a first linear motion subassembly 290 that selectively extends and/or moves at least a portion of end effector 100 along longitudinal axis 160, a second linear motion subassembly 300 that selectively extends and/or moves at least a portion of end effector 100 along first axis 210, and/or a third linear motion subassembly 310 that selectively extends and/or moves at least a portion of end effector 100 along a second axis 320 (i.e., an X-axis) that is substantially perpendicular to longitudinal axis 160 and/or first axis 210. Moreover, in the exemplary embodiment, end effector 100 includes a first axis rotation assembly 330 that selectively rotates and/or moves at least a portion of end effector 100 about longitudinal axis 160, and/or a second axis rotation assembly 340 that selectively rotates and/or moves at least a portion of end effector 100 about second axis 320. Accordingly, in the exemplary embodiment, end effector 100 has a plurality of degrees of freedom that enable end effector 100 or, more particularly, collar swaging tool 200 to be precisely positioned within the confined space.

Figure 4:
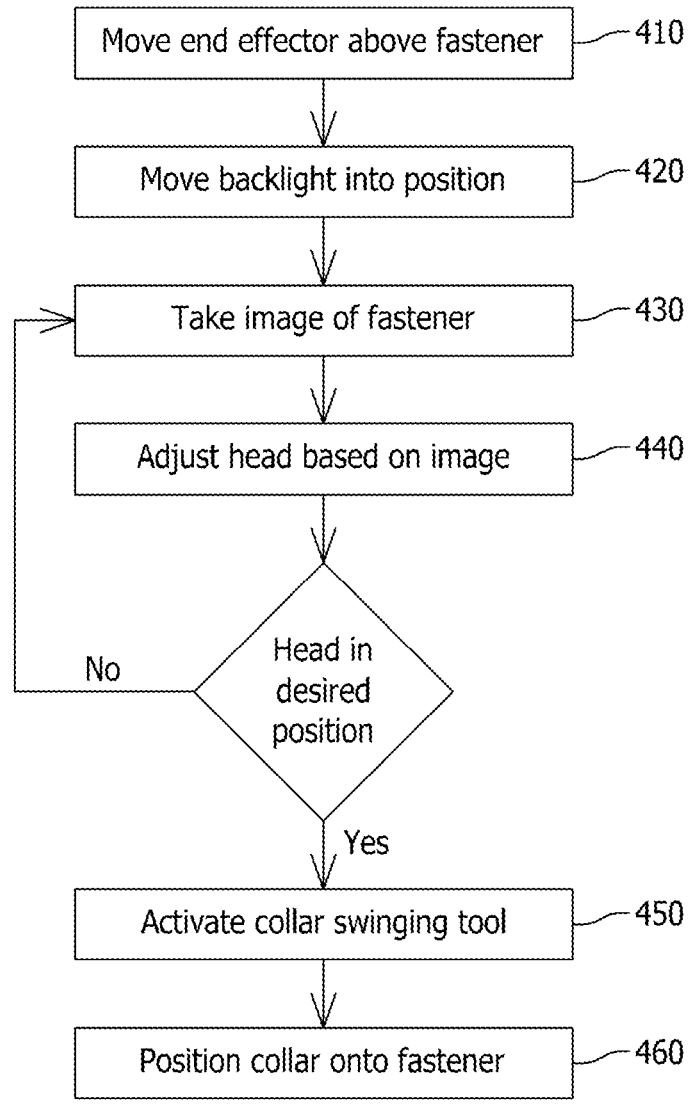
FIG. 4 is a flow chart illustrating an exemplary installation process using the end effector shown in FIGS. 1-3.

FIG. 4 is a flow chart illustrating an exemplary installation process 400 using end effector 100. During operation, in the exemplary embodiment, actuator system 280 selectively moves 410 at least a portion of end effector 100 within a confined space to position head 130 generally adjacent to fastener 120. For example, in the exemplary embodiment, head 130 is aligned with a center and/or an axial vector of fastener 120 and selectively positioned approximately 0.5 inches above a top of the tail of fastener 120. Alternatively, head 130 may be positioned in any alignment and/or position that enables end effector 100 to function as described herein.

In the exemplary embodiment, first subsystem 230 provides macro-location data that facilitates positioning head 130 and/or body 140 within the confined space, and second subsystem 240 provides micro-location data that facilitates positioning head 130 generally adjacent to fastener 120. In the exemplary embodiment, backlight 270 is moved 420 into position over and/or behind fastener 120 and illuminates behind fastener 120 to create a silhouette shadow for second subsystem 240 to take 430 at least one image of fastener 120. More specifically, in the exemplary embodiment, each second camera 260 takes 430 at least one image of fastener 120 from a respective angle to facilitate accurately and/or precisely positioning head 130 relative to fastener 120. That is, in the exemplary embodiment, head 130 is adjusted and/or moved 440 based on the at least one image or fastener 120 such that head 130 is in a desired position relative to fastener 120.

In the exemplary embodiment, collar swaging tool 200 is activated 450 to facilitate moving collar 110 towards fastener 120. More specifically, in the exemplary embodiment, collar 110 is pushed and/or moved by the first gas cylinder towards the predetermined position. When collar 110 is in the predetermined position, in the exemplary embodiment, the second gas cylinder is triggered to push and/or move fingers 190 towards the finger deployed position. When fingers 190 are in the finger deployed position, in the exemplary embodiment, collar swaging tool 200 and/or second linear motion subassembly 300 is triggered to push and/or move collar 110 down towards fastener 120. In the exemplary embodiment, collar 110 is positioned 460 onto fastener 120 as fingers 190 retract back towards the finger home position. More specifically, in the exemplary embodiment, the gas cylinder system is operated in reverse to facilitate retracting fingers 190 back towards the finger home position.

In the exemplary embodiment, collar swaging tool 200 swages collar 110, removes the fastener tail, and/or stores the fastener tail in the tail storage compartment. In the exemplary embodiment, as collar swaging tool 200 returns to the swaging tool home position, second cameras 260 take another image to verify that collar 110 was properly swaged on fastener 120. In the exemplary embodiment, collar swaging tool 200 may be iteratively readjusted and/or moved to position a plurality of collars 110 onto a plurality of fasteners 120.

Figure 5:
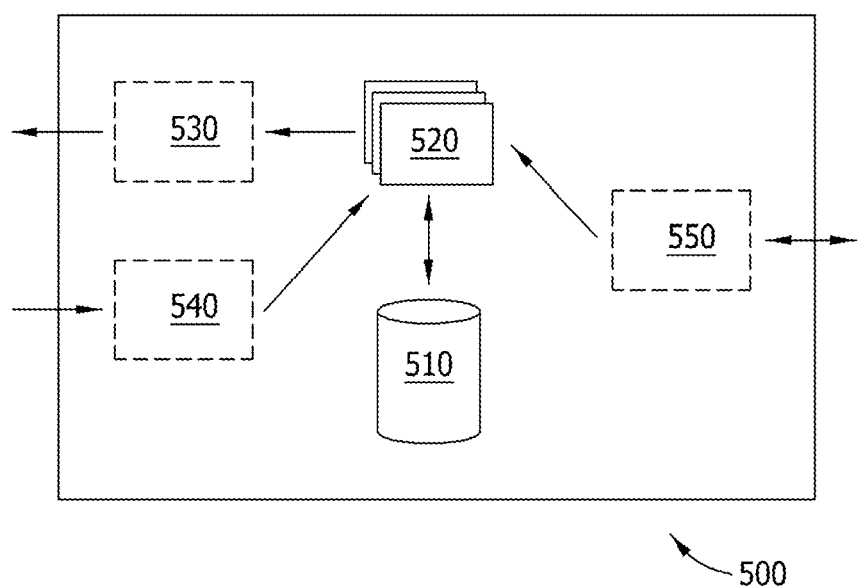
FIG. 5 is a schematic illustration of a computing device that may be used with the end effector shown in FIGS. 1-3.

FIG. 5 is a schematic illustration of a computing device 500. In the exemplary embodiment, computing device 500 is communicatively coupled to end effector 100 such that at least a portion of end effector 100 may be automatically controlled. In the exemplary embodiment, computing device 500 includes a memory device 510 and a processor 520 coupled to memory device 510 for use in executing instructions. More specifically, in the exemplary embodiment, computing device 500 is configurable to perform one or more operations described herein by programming memory device 510 and/or processor 520. For example, processor 520 may be programmed by encoding an operation as one or more executable instructions and by providing the executable instructions in memory device 510.

Processor 520 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 510 includes one or more devices (not shown) that enable information such as executable instructions and/or other data to be selectively stored and retrieved. In the exemplary embodiment, such data may include, but is not limited to, actuator data, sensor data, lighting properties, operational data, and/or control algorithms. In the exemplary embodiment, computing device 500 receives sensor data and/or user input and is programmed to automatically move and/or operate at least a portion of end effector 100 based on the sensor data and/or user input. Computing device 500 may be configured to use any algorithm and/or method that enable the methods and systems to function as described herein. Memory device 510 may also include one or more computer readable media, such as, without limitation, dynamic random access memory (DRAM), static random access memory (SRAM), a solid state disk, and/or a hard disk.

In the exemplary embodiment, computing device 500 includes a presentation interface 530 that is coupled to processor 520 for use in presenting information to a user. For example, presentation interface 530 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 530 includes one or more display devices.

Computing device 500, in the exemplary embodiment, includes an input interface 540 for receiving input from the user. In the exemplary embodiment, input interface 540 receives information suitable for use with the methods described herein. For example, in the exemplary embodiment, the user may input an instruction for moving and/or operating at least a portion of end effector 100. Input interface 540 is coupled to processor 520 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 530 and as input interface 540.

In the exemplary embodiment, computing device 500 includes a communication interface 550 that is coupled to processor 520. In the exemplary embodiment, communication interface 550 communicates with at least one remote device. For example, communication interface 550 may use, without limitation, a wired network adapter, a wireless network adapter, and/or a mobile telecommunications adapter. A network (not shown) used to couple computing device 500 to the remote device may include, without limitation, the Internet, a local area network (LAN), a wide area network (WAN), a wireless LAN (WLAN), a mesh network, and/or a virtual private network (VPN) or other suitable communication means.

The embodiments described herein relate generally to assembly tools and, more particularly, to methods and systems for coupling a collar to a target object in an area of limited space. The embodiments described herein are sized to operate in a confined space and include a head, an actuator system, and a sensor system. Moreover, the assembly tool described herein includes a dispensing system that enables the assembly tool to couple a plurality of collars to a plurality of target objects. Accordingly, the embodiments described herein facilitate decreasing an installation time, recurring costs, and/or span time with assembling at least some systems.

Exemplary embodiments of methods and systems for coupling a collar to a target object are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of coupling a collar to a fastener in a confined space, said method comprising:

detecting, using a first subsystem of a sensor system, a first position of a head of an assembly tool within the confined space, the head including a collar swaging tool that is moveable along a first axis, wherein the first subsystem comprises a first camera and is disposed on the assembly tool;

positioning, using an actuator system, the head within the confined space, the actuator system communicatively coupled to the sensor system;

moving a backlight coupled to the head from a home position to a deployed position, wherein the backlight in the deployed position creates a silhouette shadow of the fastener;

detecting, using a second subsystem of the sensor system, a second position of the collar swaging tool relative to the fastener, wherein the second subsystem comprises a plurality of second cameras disposed on the assembly tool, wherein each second camera captures at least one image of the fastener from a respective angle to determine the second position, the backlight and at least one second camera of the plurality of second cameras being positioned on a common side of the fastener;

feeding, using an arm of a collar dispensing system, the collar to a plurality of fingers of the automated collar dispensing system; and automatically moving the collar swaging tool along the first axis to position the collar swaging tool relative to the fastener based on the detected second position.

2. A method in accordance with claim 1, wherein positioning the head further comprises moving the head along the first axis, using a first linear motion subassembly of the actuator system, a second axis substantially perpendicular to the first axis, and a longitudinal axis substantially perpendicular to the first axis and the second axis, wherein a second linear motion subassembly of the actuator system moves the head along the second axis, and wherein a third linear motion subassembly of the actuator system moves the head along the longitudinal axis.

3. A method in accordance with claim 2, wherein positioning the head further comprises rotating the head about the first axis, using a first rotation assembly, and the second axis, using a second rotation assembly such that the head includes five degrees of freedom.

4. A method in accordance with claim 1, wherein moving a backlight further comprises moving the backlight along the first axis to create the silhouette shadow.

5. A method in accordance with claim 1 further comprising retaining, using the plurality of fingers, the collar in a predetermined position.

6. A method in accordance with claim 5 further comprising:
positioning, using a gas cylinder system of the collar dispensing system, the collar in the predetermined position; and
moving, using the gas cylinder system, the collar over the fastener from the predetermined position.

7. A method in accordance with claim 1 further comprising coupling a wrist of the assembly tool to a robot system.

8. An assembly tool for use in coupling a collar to a fastener in a confined space, said assembly tool having a longitudinal axis, said assembly tool comprising:

a head comprising a collar swaging tool that is moveable along a first axis substantially perpendicular to the longitudinal axis;

a sensor system comprising:
a backlight coupled to said head, said backlight is moveable between a home position and a deployed position, said backlight in the deployed position is operable to create a silhouette shadow of the fastener;
a first subsystem disposed on said assembly tool, said first subsystem comprising a first camera operable to detect a first position of said head within the confined space; and
a second subsystem disposed on said assembly tool, said second subsystem comprises a plurality of second cameras operable to detect a second position of said collar swaging tool relative to the fastener, each said second camera is operable to capture at least one image of the fastener from a respective angle for use in determining the second position, wherein said backlight and at least one second camera of said plurality of second cameras are positioned on a common side of the fastener;

a collar dispensing system comprising an arm and a plurality of fingers, said arm configured to feed the collar to said plurality of fingers; and an actuator system communicatively coupled to said sensor system to facilitate positioning said head within the confined space, and said collar swaging tool relative to the fastener based on the detected second position.

9. An assembly tool in accordance with claim 8, wherein said actuator system comprises:
a first linear motion subassembly configured to move said head along the first axis;
a second linear motion subassembly configured to move said head along a second axis substantially perpendicular to the first axis; and
a third linear motion subassembly configured to move said head along the longitudinal axis substantially perpendicular to the first axis and the second axis.

10. An assembly tool in accordance with claim 9, wherein said actuator system comprises:
a first rotation assembly configured to rotate said head about the first axis; and
a second rotation assembly configured to rotate said head about the second axis.

11. An assembly tool in accordance with claim 8, wherein said backlight is moveable along the first axis between the home position and the deployed position.

12. An assembly tool in accordance with claim 8, wherein said plurality of fingers are configured to retain the collar in a predetermined position.

13. An assembly tool in accordance with claim 12, wherein said head further comprises a gas cylinder system configured to position the collar in the predetermined position, and move the collar over the fastener from the predetermined position.

14. An assembly tool in accordance with claim 8 further comprising a wrist coupleable to a robot system.

* * * * *